(12) United States Patent
Thompson et al.

(10) Patent No.: US 8,430,954 B2
(45) Date of Patent: *Apr. 30, 2013

(54) CRYSTAL FORMS OF QUINACRIDONES MADE FROM 2,9-DIMETHOXYQUINACRIDONE AND 2,9-DICHLOROQUINACRIDONE

(75) Inventors: Brian Thompson, Goose Creek, SC (US); Daphne Rice, Charleston, SC (US); Tracie Tibbs, Charleston, SC (US); Bobby Mims, Summerville, SC (US); Thomas Flatt, Summerville, SC (US); Richard Faubion, Cincinnati, OH (US); Wengan Wu, Mt. Pleasant, SC (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/473,240

(22) Filed: May 16, 2012

(65) Prior Publication Data

US 2012/0260823 A1  Oct. 18, 2012

Related U.S. Application Data (62) Division of application No. 12/989,269, filed as application No. PCT/US2009/041698 on Apr. 24, 2009, now Pat. No. 8,197,592.

(60) Provisional application No. 61/047,800, filed on Apr. 25, 2008.

(51) Int. Cl.
  *C09B 67/52* (2006.01)
  *C09B 48/00* (2006.01)
(52) U.S. Cl.
  USPC ............... 106/495; 106/497; 546/49; 546/56
(58) Field of Classification Search .................. 106/495, 106/497; 546/49, 56
  See application file for complete search history.

(56) References Cited

U.S. PATENT DOCUMENTS

| 3,160,510 A | 12/1964 | Ehrich |
| 3,257,405 A | 6/1966 | Gerson et al. |
| 3,317,539 A | 5/1967 | Jaffe |
| 3,647,494 A | 3/1972 | Ehrich et al. |
| 5,236,498 A | 8/1993 | Zaloum et al. |
| 5,614,014 A | 3/1997 | Urban |
| 5,972,099 A | 10/1999 | Badejo et al. |
| 6,987,186 B2 | 1/2006 | Cole et al. |
| 7,101,428 B2 | 9/2006 | He et al. |
| 7,161,007 B2 | 1/2007 | Babler et al. |
| 7,166,158 B2 | 1/2007 | Mitina et al. |
| 7,419,542 B2 | 9/2008 | He et al. |
| 8,197,592 B2 * | 6/2012 | Thompson et al. ........... 106/495 |
| 2007/0034117 A1 | 2/2007 | He et al. |

OTHER PUBLICATIONS

"C.I. Pigment Violet 55", Fibertech, Sun Chemical (May 15-16, 2007) pp. 1-17.
Likibi, P., "C.I. Pigment Violet 55 New Quinacridone, Pigment," Sun Chemical Performance Pigments, pp. 1-32.
Written Opinion dated Jun. 30, 2000 for Application No. PCT/US09/41698.

* cited by examiner

*Primary Examiner* — Anthony J Green
(74) *Attorney, Agent, or Firm* — McKenna Long & Aldridge, LLP (57) ABSTRACT

Novel crystal forms of solid solutions of 2,9-dimethyoxyquinacridone and 2,9-dichloroquinacridone. The crystal forms may be formed by a process comprising the steps of: a) heating a mixture of 2,5-di(4-methoxyanilino)terephthalic acid, and 2,5-di(4-chloroanilino)terephthalic acid in polyphorsphoric acid at a temperature less than 1050 C to form a mixture of 2,9-dimethoxyquinacridone and 2,9-dichloroquinacridone; b) combining the mixture of 2,9-dimethoxyquinacridone and 2,9-dichloroquinacridone with water; and c) heating the mixture of 2,9-dimethoxyquinacridone and 2,9-dichloroquinacridone at a temperature not more than 110° C. Another crystal form may be formed by the process of heating a mixture of 2,9-dimethoxyquinacridone and 2,9-dichloroquinacridone in a polar aprotic solvent. These products are may be used for coloring fibers, plastics, paints, coatings, printing inks, color filters, cosmetics, automotive coatings, textiles, fibers, powder coatings, in-mold coatings, laminate films, and the like.

13 Claims, 11 Drawing Sheets

CRYSTAL FORMS OF QUINACRIDONES MADE FROM 2,9-DIMETHOXYQUINACRIDONE AND 2,9-DICHLOROQUINACRIDONE

CROSS REFERENCE TO RELATED APPLICATIONS

The present application is a divisional application of U.S. patent application Ser. No. 12/989,269, filed on May 6, 2011, now U.S. Pat. No. 8,197,592, which is a PCT national stage application of PCT/US2009/041698, filed on Apr. 24, 2009, which claims the benefit of the provisional patent application Ser. No. 61/047,800, filed on Apr. 25, 2008, all of which are hereby incorporated by reference in their entireties.

BACKGROUND

Quinacridones are well known organic pigments. They may be manufactured by acid catalyzed ring closure of aniline-terephthalic acids. The color and other properties of quinacridone pigments are determined by their substitution and crystal structure. Another well known form that affects color and other properties is the forming of solid solutions. One such quinacridone solid solution is formed from the mixture of 2,9-dimethoxyquinacridone and 2,9-dichloroquinacridone, which is known as Color Index Pigment Violet 55. Examples of solid solutions formed from different ratios of 2,9-dimethoxyquinacridone and 2,9-dichloroquinacridone are shown in U.S. Pat. No. 5,236,498.

Impurities produced during the synthesis of quinacridones also affect the properties of the final pigment and reduce the amount of pigment produced.

Consequently, a need exists for new quinacridone pigments that have an extended range of colors that can be produced with a minimum of impurities and have the desired chroma, hue, bleed resistance and durability.

BRIEF SUMMARY

The above-noted and other deficiencies may be overcome by the new crystal forms of a solid solution of 2,9-dimethyoxyquinacridone and 2,9-dichloroquinacridone, described as Type II and III, and the processes for producing them.

In one aspect, a pigment comprising 2,9-dimethoxyquinacridone and 2,9-dichloroquinacridone, is made by the process comprising the steps of: a) heating a mixture of 2,5-di(4-methoxyanilino)terephthalic acid, and 2,5-di(4-chloroanilino)terephthalic acid in polyphosphoric acid at a temperature less than 105° C. to form a mixture of 2,9-dimethoxyquinacridone and 2,9-dichloroquinacridone; b) combining the mixture of 2,9-dimethoxyquinacridone and 2,9-dichloroquinacridone with water; and c) heating the mixture of 2,9-dimethoxyquinacridone and 2,9-dichloroquinacridone at a temperature not more than 110° C.

In another aspect, a pigment comprising 2,9-dimethoxyquinacridone and 2,9-dichloroquinacridone, is made by the process of heating the mixture of 2,9-dimethoxyquinacridone and 2,9-dichloroquinacridone in a polar aprotic solvent.

These and other objects and advantages shall be made apparent from the accompanying drawings and the description thereof.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

DETAILED DESCRIPTION

New crystal forms of solid solutions formed from mixtures of 2,9-dimethoxyquinacridone and 2,9-dichloroquinacridone have been prepared and identified. These crystal forms of solid solutions are characterized by different X-ray patterns. The previously known crystal form will be referred to as Type I. The two new crystal forms will be referred to as Type II and Type III. The crystal structure of quinacridones is known to be sensitive to many process variables. Such variables include the solvent used to precipitate the quinacridone, the impurities in the reaction, the ring closure reaction conditions and/or conditioning methods.

When these new crystal types were first formed, the new colors of the pigments were originally thought to be because of the differing ratios of 2,9-dimethoxyquinacridone and 2,9-dichloroquinacridone. It was later determined that the new colors are attributable to the new crystal types. Some of the new colors are similar to the colors formed by PV19. However, the mixtures of 2,9-dimethoxyquinacridone and 2,9-dichloroquinacridone in the new crystal types are able to form a much larger gamut of colors than PV19.

Type II Crystal Form

In one embodiment, the Type II crystal is formed by ring closing 2,5-di(4-methoxyanilino)terephthalic acid, and 2,5-di(4-chloroanilino)terephthalic acid in acid at an elevated temperature to form a mixture of 2,9-dimethoxyquinacridone and 2,9-dichloroquinacridone. This reaction mixture is then added to water and heated.

Ring closures to form quinacridones may use a variety of acids, such as sulfuric acid or polyphosphoric acid. The use of polyphosphoric acid has the advantages of being a straightforward and commercially viable procedure. However, the polyphosphoric acid can produce undesirable byproducts when the ring closures are done at too high a temperature or for too long. Controlling the temperature and time of these ring closures is essential to producing a product that is essentially free of undesirable byproducts such as phosphated products. The temperature for the ring closure may be less than 105° C., about 100° C. or less, from about 100° C. to about 90° C., or from about 95° C. to about 90° C. The temperature need only be high enough to allow the ring closure reaction to take place and for the solvent to have a low enough viscosity. The amount of polyphosphoric acid used in the ring closing may be from about 2 parts by weight to about 50 parts by weight for 1 part by weight of the terephthalic acids. In one embodiment the range may be from about 4 to about 6 parts of acid to 1 part of the terephthalic acids.

When ring closure is completed, the reaction mixture is added to water, causing the quinacridone to precipitate. The temperature of the water may be about room temperature. The mixture may be heated and held at a temperature greater than about 80° C., about 85° C., about 90° C., or about 95° C.

After the ring closure is completed and the reaction mixture quenched, the pigment may be isolated from the slurry by filtration to form a presscake. In one embodiment, the presscake may be reslurried in water. In one embodiment, the pH of the water may then be adjusted to about 12 or more by adding a base, then heated. The slurry may be heated and held at a temperature greater than about 80° C., about 85° C., about 90° C., about 95° C., about 100° C., about 125° C. or about 135° C. The slurry may be heated at atmospheric conditions to remove any undesired alkaline soluble impurities such as partially reacted starting material. After the slurry is cooled, the pigment may be isolated by filtration. The presscake may be washed with hot water and de-ionized water.

In one embodiment, the pigment of crystal form Type II, in an automotive solvent basecoat/clearcoat paint system, has CIE color coordinates of about $8.0 \leq a^* \leq$ about 33.0, about $-32.1 \leq b^* \leq$ about $-12.1$, and about $19.0 \leq C^* \leq$ about 41.0. In another embodiment, the pigment of crystal form Type II, in an automotive solvent basecoat/clearcoat paint system, has CIE color coordinates of about $10.0 \leq a^* \leq$ about 31.0, about $-25.0 \leq b^* \leq$ about $-17.0$, and about $22.0 \leq C^* \leq$ about 39.0.

In one embodiment, the pigment with crystal Type II comprises from about 10% to about 90% 2,9-dimethoxyquinacridone and from about 90% to about 10% 2,9-dichloroquinacridone. In another embodiment, the pigment with crystal Type II comprises from about 25% to about 75% 2,9-dimethoxyquinacridone and from about 75% to about 25% 2,9-dichloroquinacridone. In another embodiment, the pigment with crystal Type II comprises from about 25% to about 50% 2,9-dimethoxyquinacridone and from about 75% to about 50% 2,9-dichloroquinacridone. In another embodiment, the pigment with crystal Type II comprises about 25% 2,9-dimethoxyquinacridone and about 75% 2,9-dichloroquinacridone.

In one embodiment, the pigment is a mixture of crystal Type I and Type II, and comprises from about 10% to about 90% 2,9-dimethoxyquinacridone and from about 90% to about 10% 2,9-dichloroquinacridone. In another embodiment, the pigment is a mixture of crystal Type I and Type II, and comprises from about 25% to about 75% 2,9-dimethoxyquinacridone and from about 75% to about 25% 2,9-dichloroquinacridone. In another embodiment, the pigment is a mixture of crystal Type I and Type II, and comprises from about 25% to about 50% 2,9-dimethoxyquinacridone and from about 75% to about 50% 2,9-dichloroquinacridone. In another embodiment, the pigment is a mixture of crystal Type I and Type II, and comprises about 25% 2,9-dimethoxyquinacridone and about 75% 2,9-dichloroquinacridone.

In one embodiment the pigment has X-ray powder diffraction d-values at about 3.4 Å, about 4.2 Å, about 6.4 Å, about 8.3 Å, and about 16.7 Å.

In one embodiment, pure crystal Type II may not be formed. Mixtures of crystal Type I and II may be formed. Evidence of crystal Type II may be observed in the X-ray powder diffraction pattern by subtracting the spectra of a Type I sample from the spectra of the mixed sample. The 2-theta values not in common with both spectra can be attributed to crystal Type II.

Type III Crystal Form

In one embodiment the Type III crystal is formed by heating a mixture of 2,9-dimethoxyquinacridone and 2,9-dichloroquinacridone in an excess of polar aprotic solvent, where the pH of the mixture has been adjusted. In one embodiment the polar aprotic solvent is N-methyl pyrrolidone. The mixture may be heated to a temperature of not less than about 120° C. In one embodiment, the mixture may be heated to a temperature of not less than about 145° C. In one embodiment, the pH of the mixture in the polar aprotic solvent is not less than about 12. The selected solvent, the selection of heating temperature, and the pH of the mixture may be combined in any way.

In one embodiment the pigment having a crystal form Type III, in an automotive solvent basecoat/clearcoat paint system, has CIE color coordinates of about $7.1 \leq a^* \leq$ about 23.1, about $-28.1 \leq b^* \leq$ about $-12.7$, and about $19.0 \leq C^* \leq$ about 35.0. In another embodiment, the pigment having a crystal form Type III, in an automotive solvent basecoat/clearcoat paint system, has CIE color coordinates of about $13.0 \leq a^* \leq$ about 21.0, about $-26.0 \leq b^* \leq$ about $-18.0$, and about $22.0 \leq C^* \leq$ about 33.0.

In one embodiment, the pigment with crystal Type III comprises from about 10% to about 90% 2,9-dimethoxyquinacridone and from about 90% to about 10% 2,9-dichloroquinacridone. In another embodiment, the pigment with crystal Type III comprises from about 25% to about 75% 2,9-dimethoxyquinacridone and from about 75% to about 25% 2,9-dichloroquinacridone. In another embodiment, the pigment with crystal Type III comprises from about 25% to about 50% 2,9-dimethoxyquinacridone and from about 75% to about 50% 2,9-dichloroquinacridone. In another embodiment, the pigment with crystal Type III comprises about 25% 2,9-dimethoxyquinacridone and about 75% 2,9-diehloroquinaeridone.

In one embodiment, the pigment is a mixture of crystal Type I and Type III, and comprises from about 10% to about 90% 2,9-dimethoxyquinacridone and from about 90% to about 10% 2,9-dichloroquinacridone. In another embodiment, the pigment is a mixture of crystal Type I and Type III, and comprises from about 25% to about 75% 2,9-dimethoxyquinacridone and from about 75% to about 25% 2,9-dichloroquinacridone. In another embodiment, the pigment is a mixture of crystal Type I and Type III, and comprises from about 25% to about 50% 2,9-dimethoxyquinacridone and from about 75% to about 50% 2,9-dichloroquinacridone. In another embodiment, the pigment is a mixture of crystal Type I and Type III, and comprises about 25% 2,9-dimethoxyquinacridone and about 75% 2,9-dichloroquinacridone.

In one embodiment the pigment comprises X-ray powder diffraction d-values at about 3.2 Å, about 3.3 Å, about 3.5 Å, about 3.9 Å, about 4.1 Å, about 4.4 Å, about 5.1 Å, about 5.6 Å, about 5.9 Å, about 8.8 Å, about 17.5 Å.

In one embodiment the pigment comprises from about 25% of 2,9-dimethoxyquinacridone and from about 75% of 2,9-dichloroquinacridone.

In one embodiment the pigment has X-ray powder diffraction d-values at about 3.2 A, about 3.8 A, about 3.9 A, about 5.4 A, about 5.6 A, about 5.9 A, and about 17.1 A.

In one embodiment, pure crystal Type III may not be formed. Mixtures of crystal Type I and III may be formed. Evidence of crystal Type III may be observed in the X-ray powder diffraction pattern by subtracting the spectra of a Type I sample from the spectra of the mixed sample. The 2-theta values not in common with both spectra can be attributed to crystal Type III.

These embodiments are only examples of some of the solid solutions that can be formed from ring closing 2,9-dimethoxyquinacridone and 2,9-dichloroquinacridone by those skilled in the art and are not limited to the ratios described.

In one embodiment mixtures of crystal Type II and III may be formed by heating a crystal Type II mixture of 2,9-dimethoxyquinacridone and 2,9-dichloroquinacridone in an excess of polar aprotic solvent, such as N-methyl pyrrolidone, where the pH of the mixture has been adjusted. The mixture may be heated to a temperature of not less than about 120° C. In one embodiment, the mixture may be heated to a temperature of not less than about 145° C. In one embodiment, the pH of the mixture in the polar aprotic solvent is not less than about 12. The selected solvent, the selection of heating temperature, and the pH of the mixture may be combined in any way.

Characterizations of Type I, II and III crystal phases were performed by X-ray powder diffraction. The X-ray powder diffraction patterns were obtained by using a Siemens D5000 diffractometer with graphite-monochromated Cu K$\alpha_1$ radiation ($\lambda$=1.5406 Å). The instrument was calibrated by using a quartz standard from Bruker AXS, Inc. (P/N C72298A227B36). The X-ray diffractions peaks are understood to be within experimental bounds and can result in slightly different peaks. It is also understood that other test methods could produce different peaks.

TABLE 1

X-ray Data of Type I - Example 1

| d (in angstroms) | Intensity |
|---|---|
| 17.4 | very strong |
| 8.7 | medium |
| 6.4 | weak |
| 5.8 | strong |
| 5.3 | weak |
| 4.4 | weak, shoulder |
| 4.2 | weak |
| 3.8 | medium |
| 3.5 | weak |
| 3.3 | very strong |

TABLE 2

X-ray Data of Type - Example 2

| d (in angstroms) | Intensity |
|---|---|
| 16.7 | very strong |
| 8.3 | weak |
| 6.4 | strong |
| 4.2 | weak |
| 3.4 | medium, broad |

TABLE 3

X-ray Data of Type III - Example 3

| d (in angstroms) | Intensity |
|---|---|
| 17.5 | strong |
| 8.8 | weak |
| 5.9 | weak |
| 5.6 | very strong |
| 5.1 | weak |
| 4.4 | weak |
| 4.1 | weak |
| 3.9 | weak |
| 3.5 | weak |
| 3.3 | medium |
| 3.2 | Medium |

TABLE 4

X-ray Data of Type III - Example 7

| d (in angstroms) | Intensity |
|---|---|
| 17.1 | very strong |
| 8.8 | very weak |
| 8.4 | very weak |
| 5.9 | strong |
| 5.6 | medium |
| 5.4 | medium |
| 5.1 | very weak |
| 4.6 | weak |
| 4.4 | very weak |
| 4.2 | weak |
| 4.1 | weak |
| 3.9 | medium |
| 3.8 | medium |
| 3.6 | weak |
| 3.5 | weak |
| 3.3 | weak |
| 3.2 | very strong |
| 3.1 | weak |
| 2.9 | weak |
| 2.8 | very weak |
| 2.7 | very weak |
| 2.6 | very weak |
| 2.5 | very weak, broad |
| 2.4 | very weak |
| 2.3 | weak |
| 2.2 | very weak |

These two new crystal forms, may be used either alone, mixed, or mixed with crystal form Type I. Uses include, but are not limited to pigmentation of fibers, plastics, paints, coatings, printing inks, color filters, cosmetics, automotive coatings, textiles, fibers, powder coatings, in-mold coatings, laminate films, and the like.

Another application for the solid solutions of 2,9-dimethoxyquinacridone and 2,9-dichloroquinacridone in the two new crystal forms is for use in FDA-compliant coatings. An FDA-compliant coating is a material such as a cured ink film, coating, plastic, or other material substantially free of solvent extractable materials (i.e., less than 10 ppb, 25 ppb, 50 ppb) or residual components when subjected to solvent under a solvent extraction test. Other possible uses for the present invention include any application where low extractable coatings or materials are advantageous (such as those used in packaging films and materials, food packaging films and materials, plastic films, children's toys, textiles, carpet fibers, cosmetics, etc.).

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

The pigments produced in the examples below were evaluated for their color properties in an automotive solvent borne basecoat/solvent borne clearcoat system as follows: The dry pigments were dispersed into the solvent borne basecoat, along with proprietary additives, on a Skandex paint shaker for 3 hours, using 2 mm steel beads (6:1 pigment:beads). The dispersion was then formulated into paints with either a $TiO_2$ paste or an Aluminum paste, to a ratio of 5:95 pigment:$TiO_2$ (tint) and 50:50 pigment:aluminum (metallic). The resulting paints were either drawndown on paper cards (tint) or sprayed onto a coilcoat-primed aluminum panel to a film thickness of 25±5 microns (metallic). The panel was then sprayed with a solvent borne acrylic clearcoat to a total film thickness of 50±5 microns, and the panel baked again at 260° F. Color data were obtained using a Macbeth Coloreye 7000A spectrophotometer for the tint drawdown and an X-Rite MA-68 multi-angle spectrophotometer for the sprayed aluminum panel

Example 1

Type I

Figure 1:
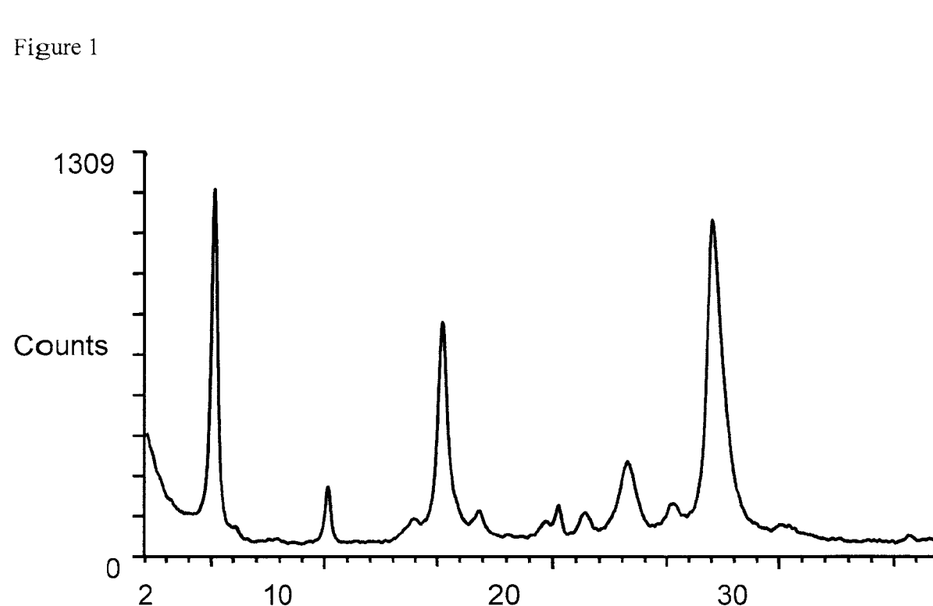
FIG. 1 is the powder X-ray diffraction pattern of the product in Example 1.

A resin flask was charged with 24 parts of 117% polyphosphoric acid and heated to 110° C. One part of dichloro dianilinoterephthalic acid (DCDATA) was added at a rate that maintained the reaction at 110-115° C. After addition of the DCDATA, the reaction was heated to 120° C. and held at 120° C. for 30 minutes. The mixture was then cooled to 85° C. and 3 parts of dimethoxy dianilinoterephthalic acid (DMATA) was added at a rate to maintain the reaction at 85-90° C. during the addition. After the DMATA was added, the mixture was held at 100-105° C. for 3 hours. The mixture was then added to a stirred round bottom flask containing 42.5 parts methanol at room temperature. During the addition, the methanol was cooled to keep the temperature at 60° C. or below. After the addition was complete, the resulting slurry was heated to reflux and maintained at reflux for 1 hour. The slurry was cooled to 40° C., isolated by filtration on a Buchner funnel, and washed to a pH>3.0. The washed presscake was reslurried in water, the pH adjusted to 6.5 to 7.5, and 0.3 parts 50% caustic soda was added. The slurry was then added to a Parr pressure reactor, heated to 140° C. and held at 140° C. for 1 hour. After cooling, the product was isolated by filtration on a Buchner funnel, washed alkali free with water, and dried. The powder x-ray diffraction pattern was the same as the previously described crystal form (U.S. Pat. No. 5,236,498, see FIG. 1), which herein is identified as Type I.

Example 2

Type II

Figure 2:
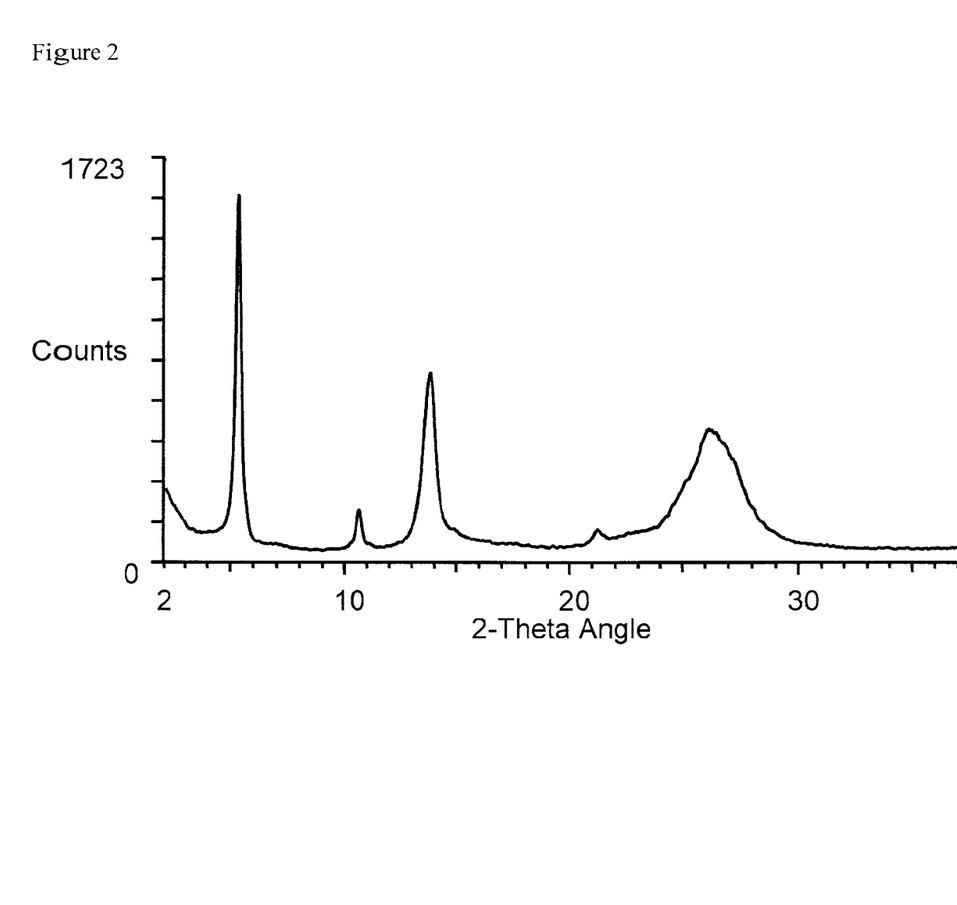
FIG. 2 is the powder X-ray diffraction pattern of the product in Example 2.

A resin flask was charged with 20 parts of 117% polyphosphoric acid, and heated to 90° C. One part of dichloro dianilinoterephthalic acid (DCDATA) was added at a rate that maintained the reaction at 90-95° C. After addition of the DCDATA, 3 parts of dimethoxy dianilinoterephthalic acid (DMATA) was added at a rate to maintain 90-95° C. during the addition. After the DMATA was added, the reaction mass was held at 90-95° C. for 6 hours. The reaction mass was then added slowly to 153 parts of agitated water at room temperature. After the addition was complete, the resulting slurry was heated to 90° C. and held at 90° C. for 1 hour. The product was isolated from the slurry by filtration on a Buchner funnel, and washed with water. The presscake was reslurried in 153 parts water, adjusted to a pH>12 with 50% caustic soda, and heated to 90° C. for 1 hour. After cooling, the product was isolated by filtration on a Buchner funnel, washed with hot water, then de-ionized water to a conductivity <100 µs. After drying, the powder x-ray diffraction pattern was distinctly different from that of the Type I crystal (Example 1), indicating a new crystal form (see FIG. 2), herein identified as Type II.

Pigments containing at least the new crystal form Type II were also made from 10% DCDATA and 90% DMATA; 90% DCDATA and 10% DMATA; 50% DCDATA and 50% DMATA; and 75% DCDATA and 25% DMATA.

Example 3

Type III

Figure 3:
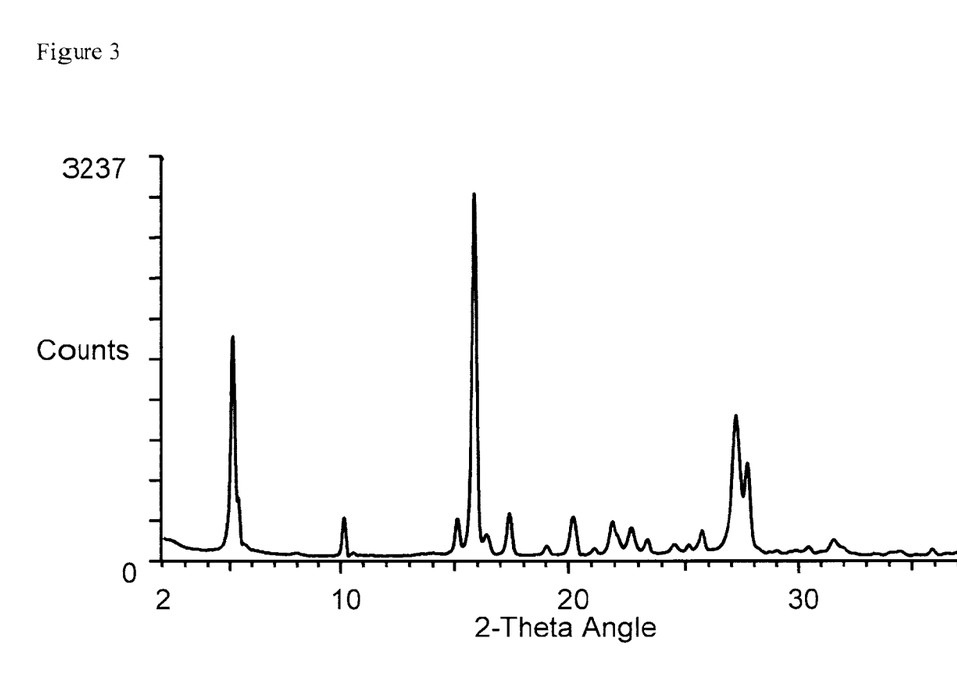
FIG. 3 is the powder X-ray diffraction pattern of the product in Example 3.

A resin flask was charged with 24 parts of 117% polyphosphoric acid, and heated to 90° C. One part of dichloro dianilinoterephthalic acid (DCDATA) was added at a rate that maintains the mixture at 90-95° C. After addition of the DCDATA, 3 parts of dimethoxy dianilinoterephthalic acid (DMATA) was added at a rate to maintain 90-95° C. After the DMATA was added, the reaction mass was heated to 100° C. and held at 100-105° C. for 6 hours. The mixture was then added slowly to 150 parts of agitated water at room temperature. After the addition was complete, the resulting slurry was heated to 90° C. and held at 90° C. for 1 hour. The product was isolated by filtration on a Buchner funnel and washed to a pH>3.0 with water. The presscake was reslurried in 15 parts N-methyl pyrrolidone, adjusted to pH 12.0 to 12.2 with 50% caustic soda and charged into a Parr pressure reactor. The reactor was heated to 125° C. and held at 125° C. for 3 hours. After cooling, the slurry was isolated by filtration on a Buchner funnel, washed until alkali free, and dried. The powder x-ray diffraction pattern of the product is distinctly different from both the Type I and Type II crystals, indicating a third crystal form (see FIG. 3), herein identified as Type III.

Example 4

Figure 4:
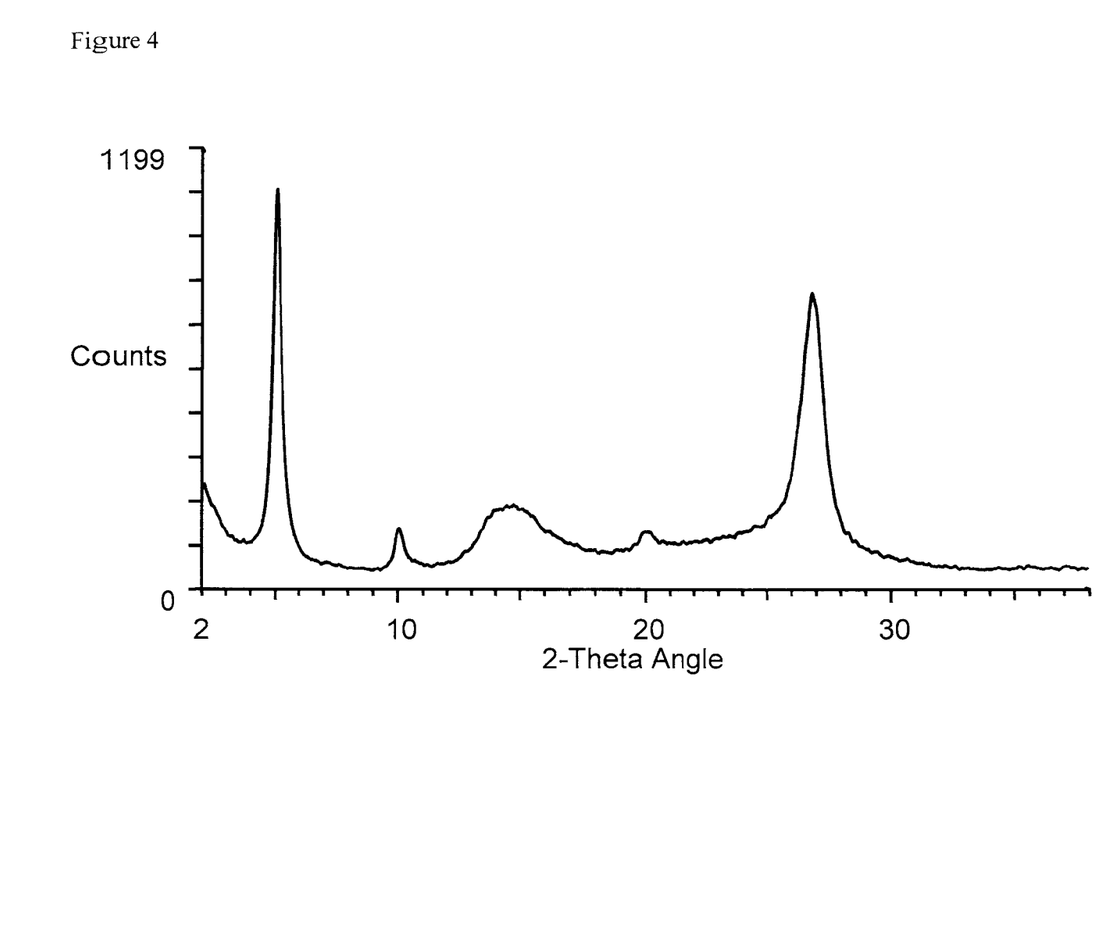
FIG. 4 is the powder X-ray diffraction pattern of the product in Example 4.

A resin flask was charged with 24 parts of 117% polyphosphoric acid, and heated to 90° C. One part of dichloro dianilinoterephthalic acid (DCDATA) was added at a rate that maintained the mixture at 90-95° C. After addition of the DCDATA, 3 parts of dimethoxy dianilinoterephthalic acid (DMATA) was added at a rate to maintain 90-95° C. After the DMATA was added, the reaction mass was heated to 100° C. and held at 100-105° C. for 3 hours. The mixture was then added slowly to 100 parts of agitated water at 80° C. After the addition was complete, the resulting slurry was heated to 90° C. and held at 90° C. for 1 hour. The product was isolated from the slurry by filtration on a Buchner funnel, and washed with water. The presscake was reslurried in 153 parts water, adjusted to pH>12 with 50% caustic soda, and heated to 90° C. for 1 hour. After cooling, the product was isolated by filtration on a Buchner funnel, washed with hot water until the pH was greater than 3.5. The presscake was reslurried with 133 parts water. Rosin (a surface treatment) (0.25 parts) was added to the slurry. The slurry was heated to 80° C. and 0.25 parts calcium chloride dihydrate was added. The pigment was isolated by filtration and dried at 70° C. Powder x-ray diffraction pattern shows this product to be a very amorphous mixture of type I and type II crystals with type II being the majority (see FIG. 4).

Example 5

Figure 5:
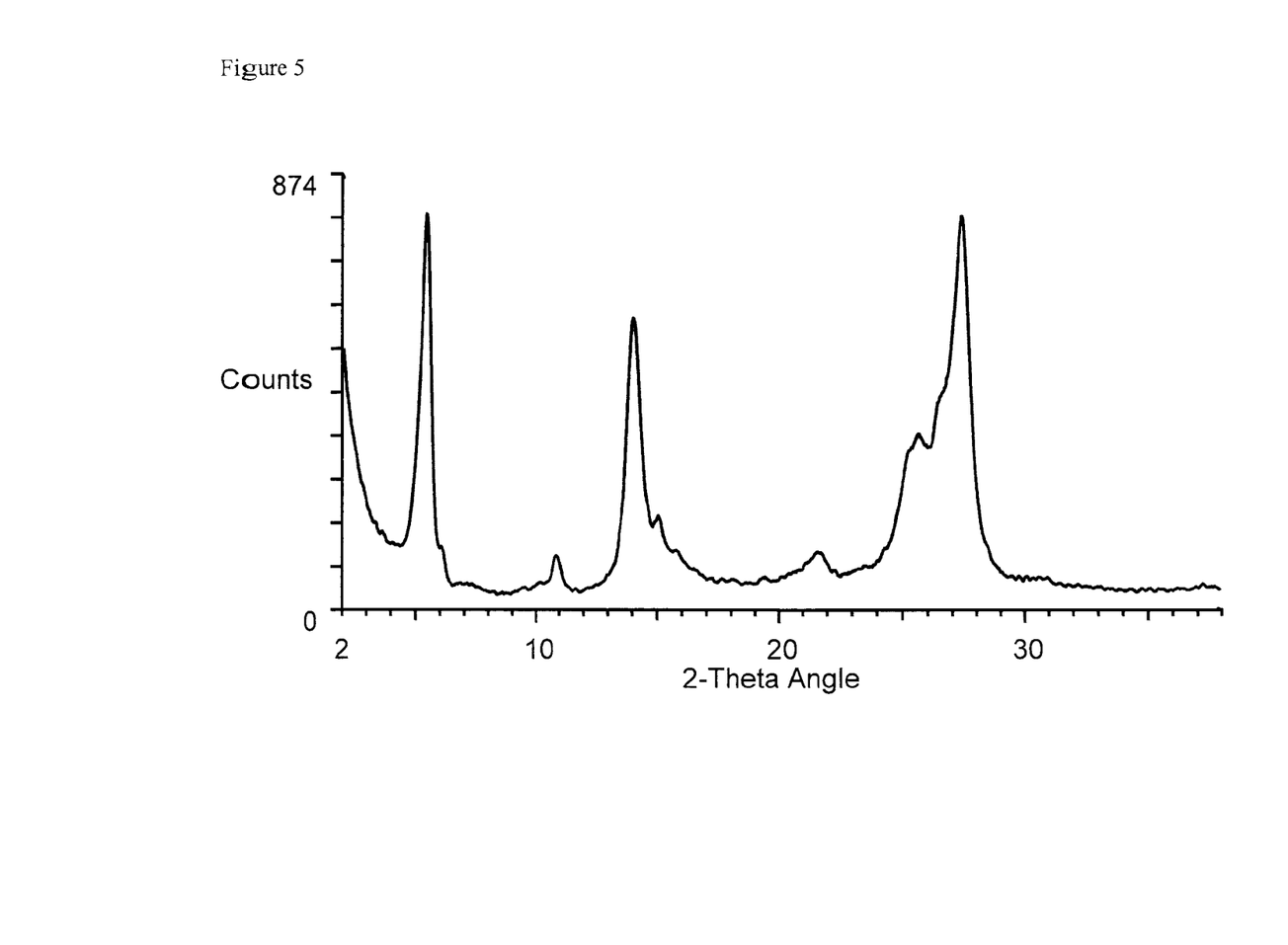
FIG. 5 is the powder X-ray diffraction pattern of the product in Example 5.

A resin flask was charged with 24 parts of 117% polyphosphoric acid, and heated to 90° C. One part of dichloro dianilinoterephthalic acid (DCDATA) was added at a rate that maintained the mixture at 90-95° C. After addition of the DCDATA, 3 parts of dimethoxy dianilinoterephthalic acid (DMATA) was added at a rate to maintain 90-95° C. After the DMATA was added, the reaction mass was heated to 100° C. and is held at 100-105° C. for 3 hours. The mixture was then added slowly to 100 parts of agitated water at room temperature. After the addition was complete, the resulting slurry was heated to 90° C. and held at 90° C. for 1 hour. The product was isolated from the slurry by filtration on a Buchner funnel, and washed with water. The presscake was reslurried in 153 parts water, adjusted to a pH>12 with 50% caustic soda, and heated to 90° C. for 1 hour. After cooling, the product was isolated by filtration on a Buchner funnel, washed with hot water until the pH was greater than 3.5. The resulting presscake was reslurried in 133 parts water. The pH of the slurry was adjusted to 12 with 50% caustic soda. This slurry was charged into an autoclave and heated for 3 hours at 124° C. The autoclave was cooled to below 80° C. and discharged. The pigment was isolated from the slurry by filtration on a Buchner funnel. The presscake was again reslurried with 133 parts water. Rosin (a surface treatment) (0.25 parts) was added to the slurry. The slurry was heated to 80° C. and 0.25 parts calcium chloride dihydrate was added. The pigment was isolated by filtration and dried at 70° C. The crystal type was a mixed crystal of type I and II comprising more of the type II crystal. This pigment has a hue that is 15.6 units redder and a chroma that is 15.4 units higher than the pigment of Example 4 (see FIG. 5).

Example 6

Type I and II

Figure 6:
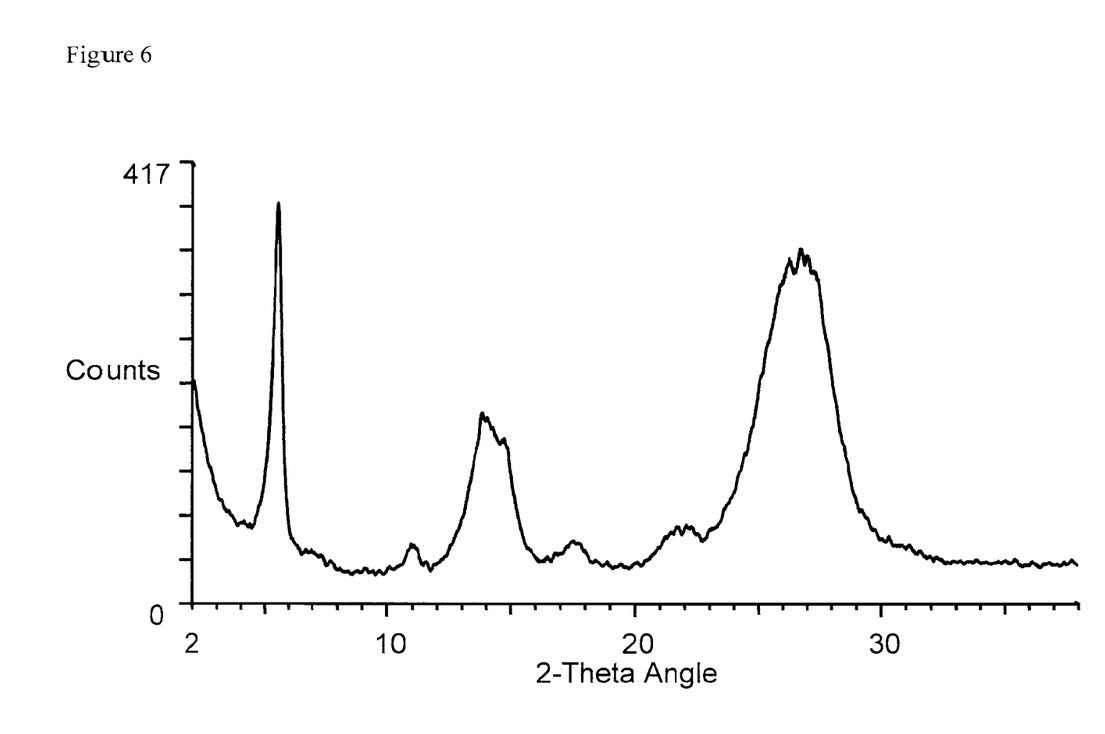
FIG. 6 is the powder X-ray diffraction pattern of the product in Example 6.

A resin flask was charged with 24 parts of 117% polyphosphoric acid, and heated to 90° C. One part of dimethoxy dianilinoterephthalic acid (DMATA) was added at a rate that maintained the mixture at 90-95° C. After addition of the DMATA, 3 parts of dichloro dianilinoterephthalic acid (DCDATA) was added at a rate to maintain 90-95° C. After the DCDATA was added, the mixture was heated to 100° C. and held at 98-102° C. for 4.5 hours. The mixture was then added slowly to agitated water at 55° C. After the addition was complete, the water slurry was heated to 90° C. and held at 90° C. for 1 hour. After cooling, the product was isolated by filtration on a Buchner funnel, washed with water until the pH was greater than 3.5. The resulting presscake was reslurried in water, adjusted to a pH of 12 with 50% caustic soda, then heated to 90° C. After holding the slurry at 90° C. for 1 hour, the slurry was cooled to 70° C. or lower. The product was then isolated on a Buchner funnel and washed until alkali free. Part of the presscake was dried. This product although very amorphous is an example of a mixed crystal of type I and II, with type II being dominant (see FIG. 6).

Example 7

Type III

Figure 7:
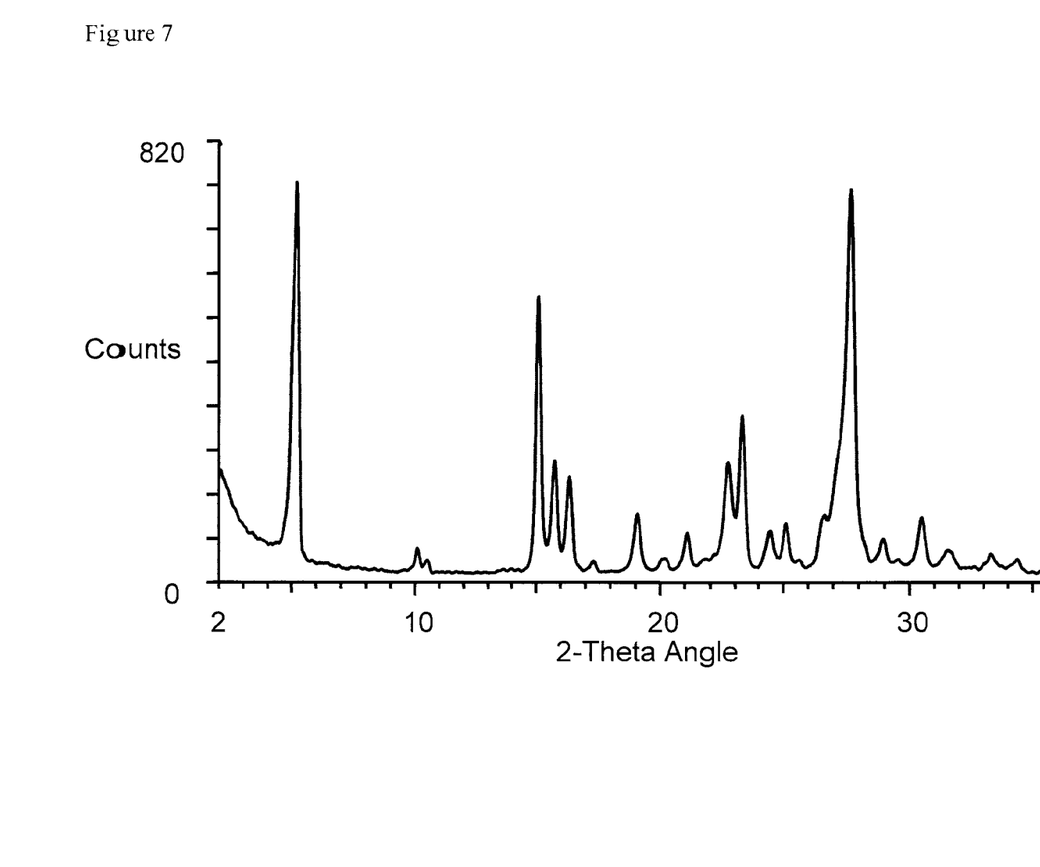
FIG. 7 is the powder X-ray diffraction pattern of the product in Example 7.

One part alkali presscake from Example 6 was slurried in 6 parts N-methyl pyrrolidone and 0.05 parts of 45% caustic potash was added. This slurry was heated to 145° C. As the temperature approached 145° C., water was distilled off. The moisture content of the slurry determines the temperature that the water vapor starts to distill. The slurry was held at 145° C. for 3 hours. The product was isolated at 70° or lower on a Buchner funnel. The presscake was washed with water and dried at 70° C. This product was a different crystal form compared to the crystal form obtained in Example 6. There are some variations in peaks and peak intensities but both Examples 7 and 3 are type III crystals (see FIG. 7). Example 7 has the reverse ratio of DMATA and DCDATA compared to that used in Example 3.

Example 8

Figure 8:
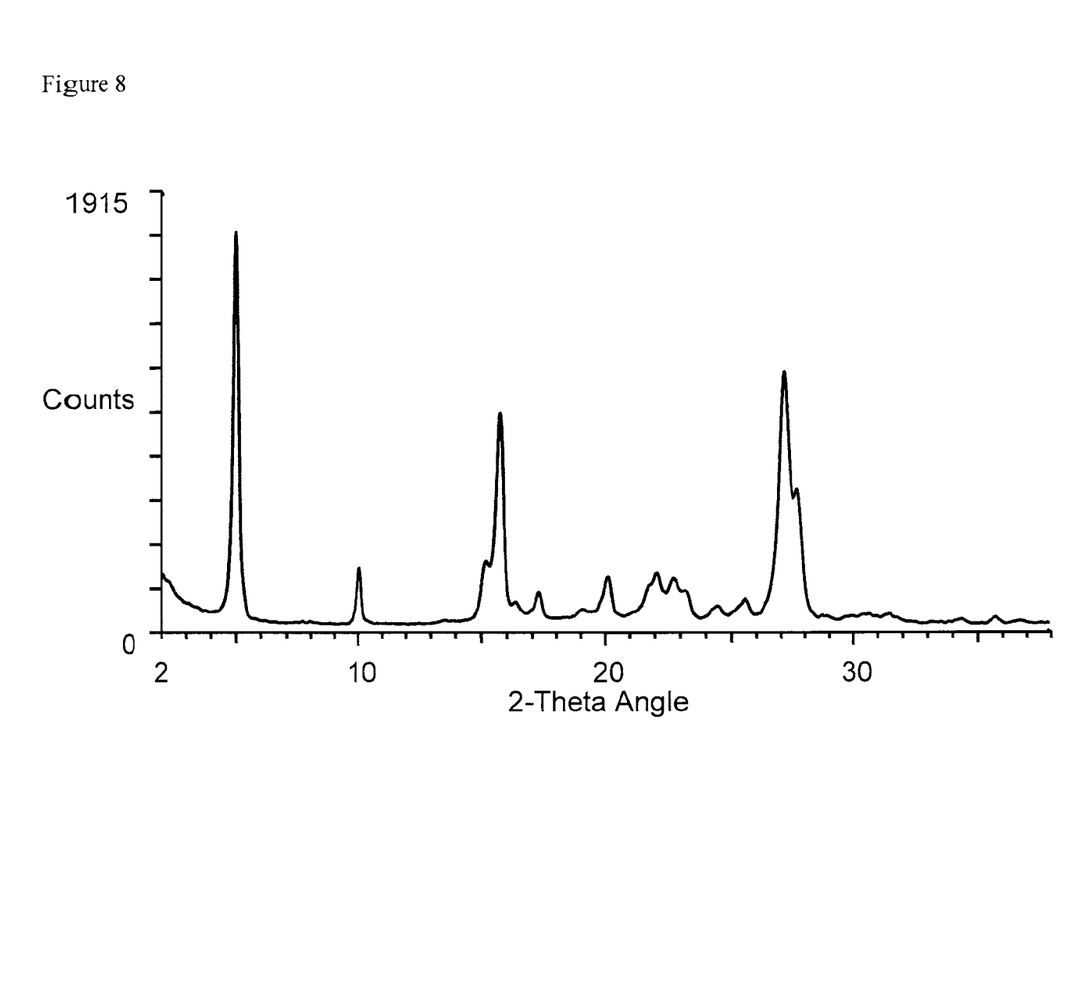
FIG. 8 is the powder X-ray diffraction pattern of the product in Example 8.
Figure 9:
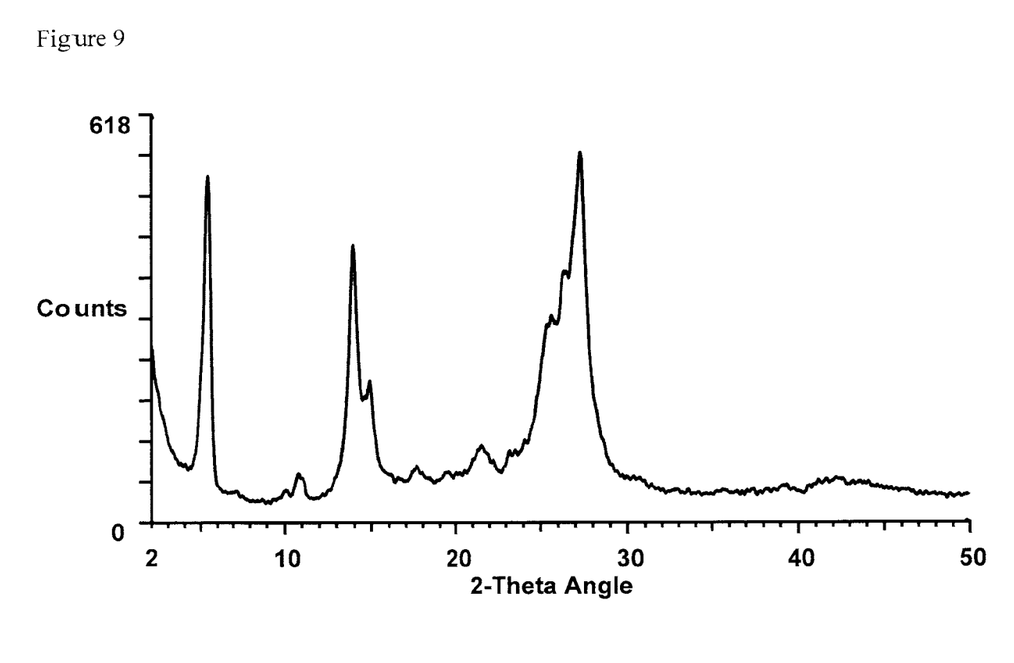
FIG. 9 is the powder X-ray diffraction pattern of a 50:50 mixture of 2,9-dimethoxyquinacridone and 2,9-dichloroquinacridone that is a mixture of crystal Type I and II.
Figure 10:
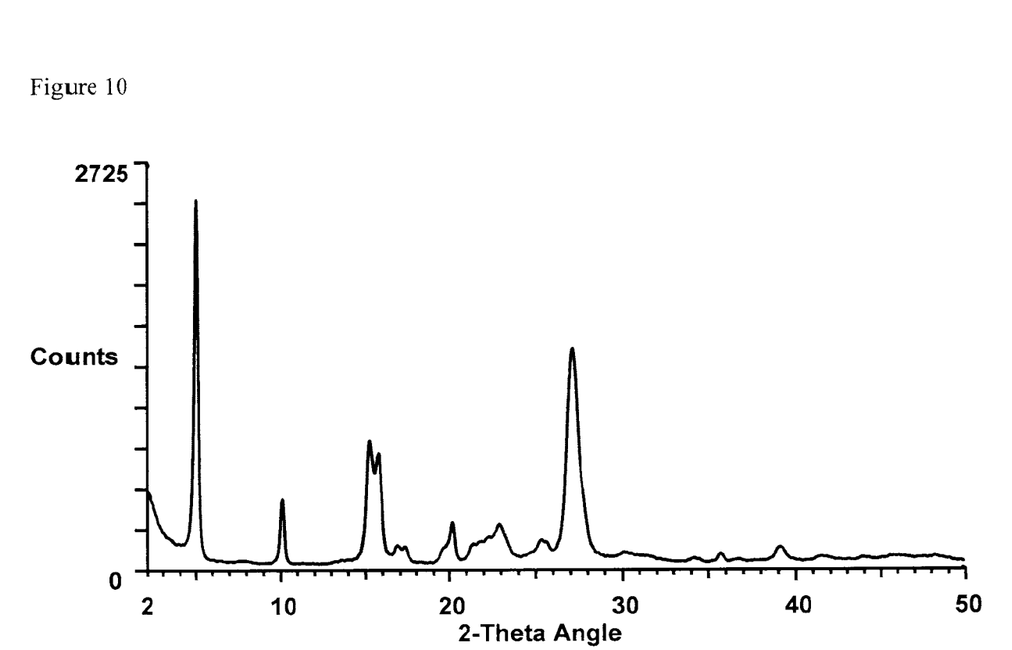
FIG. 10 is the powder X-ray diffraction pattern of a 90:10 mixture of 2,9-dimethoxyquinacridone and 2,9-dichloroquinacridone that is a mixture of crystal Type I and III.
Figure 11:
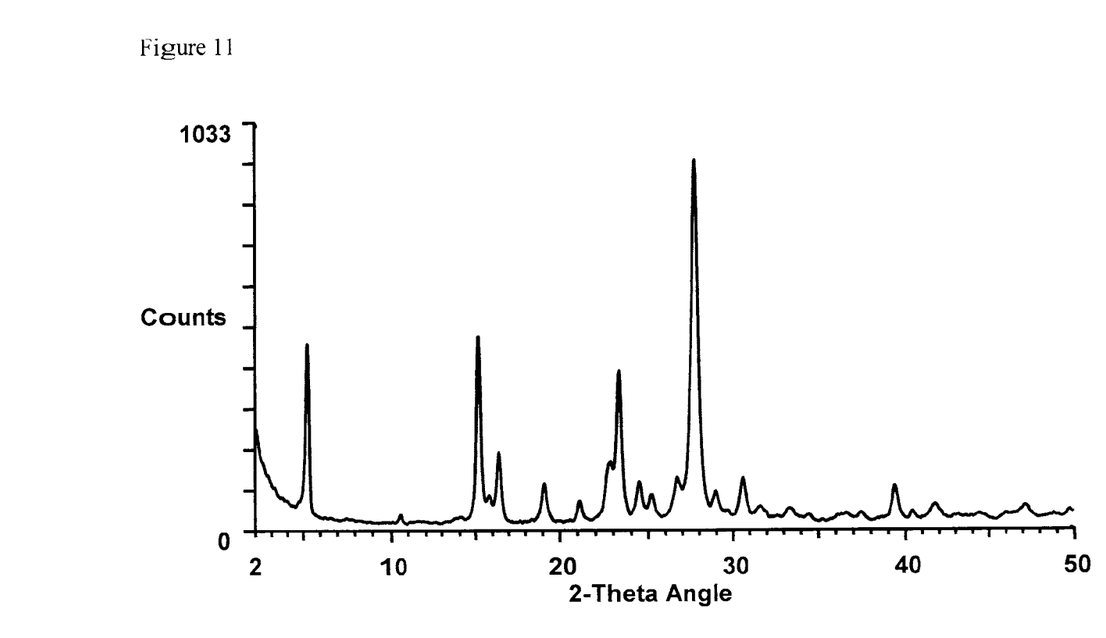
FIG. 11 is the powder X-ray diffraction pattern of a 10:90 mixture of 2,9-dimethoxyquinacridone and 2,9-dichloroquinacridone that is a mixture of crystal Type III.

A resin flask was charged with 24 parts of 117% polyphosphoric acid, and heated to 90° C. One part of dichloro dianilinoterephthalic acid (DCDATA) was added at a rate that maintained the mixture at 90-95° C. After addition of the DCDATA, 3 parts of dimethoxy dianilinoterephthalic acid (DMATA) was added at a rate to maintain 90-95° C. After the DMATA was added, the mixture was heated to 100° C. and held at 98-102° C. for 4.5 hours. The mixture was then to a stirred round bottom flask containing 42.5 parts methanol at room temperature. During the addition, the methanol was cooled to keep the temperature at 60° C. or below. Once the addition was complete, the resulting slurry was heated to reflux and maintained at reflux for 1 hour. The slurry was cooled to 40° C., isolated by filtration on a Buchner funnel, and washed to a pH>3.0. The washed presscake was reslurried in enough methanol to bring the water/methanol slurry to 80% methanol. Three parts caustic potash 45% was added. The mixture was added to an autoclave and heated under pressure to 130° C. for 3 hours. The reaction was cooled to below the boiling point and removed for filtration. The isolated product was dried at 70° C. The x-ray of the product was a mixture of Type I and Type III crystals with the majority being Type III (see FIG. 8).

Pigments containing at least the new crystal form Type III were also made from 10% DCDATA and 90% DMATA (this procedure used 20 parts PPA instead of 24 parts); and 90% DCDATA and 10% DMATA.

Caustic soda 50% or equivalent flake material may replace the caustic potash 45% in the autoclave. All parts are by weight.

Example 9

Application of Type I and II

Flexible PVC is made incorporating the pigment prepared as in Example 5.

Masstone

Flexible PVC (89.1 g) was added to the rollers and mixed in a commercial 2-roll mill set to an operating temperature of 310° F. and the nip setting at 38 mils. The PVC was mixed until it melted and became clear. Pigment (0.0900 g) was added to the PVC, and blended for 3 minutes. The colored PVC sheet was removed from the rollers using a nip of 73 mils. After the sheet was cooled it was added to the rollers of the cold mill for 12 passes, where the sheet was folded during each pass. The sheet was removed from the cold mill and put back on the hot mill. The nip setting was 38 mils until the sheet was smooth and uniform. The colored PVC sheet was then removed from the mill at a nip setting of 73 mils.

Tint

Flexible PVC (58.74 g) and Moltopren White Paste (previously hand mixed) was added to the rollers and mixed in a commercial 2-roll mill set to an operating temperature of 310° F. and the nip setting at 38 mils. The PVC was mixed until it melted and became clear. Pigment (0.06 g) was added to the PVC, and blended for 3 minutes. The colored PVC sheet was removed from the rollers using a nip of 25 mils. After the sheet was cooled it was added to the rollers of the cold mill for 12 passes, where the sheet was folded during each pass. The sheet was removed from the cold mill and put back on the hot mill. The nip setting was 22 mils until the sheet was smooth and uniform. The colored PVC sheet was then removed from the mill at a nip setting of 25 mils.

Example 10

Type I and III

A pigment that was ring closed in a process similar to Example 5 but conditioned in an autoclave at 120° C. in an alkaline mixture of water and methanol with the majority being methanol was incorporated into flexible PVC using the test method described in Example 9.

| Sample | Masstone a* | Masstone b* | Tint a* | Tint b* |
|---|---|---|---|---|
| PV 19 beta | 20.31 | 0.09 | 25.56 | −20.12 |
| PR 202 | 38.66 | 9.37 | 27.55 | −11.2 |
| PV 19 gamma | 29.01 | 6.85 | 46.20 | −8.98 |
| Example 9 | 21.45 | −8.49 | 31.92 | −28.79 |
| Example 10 | 17.73 | −7.97 | 17.25 | −24.31 |

Color Index Pigment Violet 19 beta and Color Index Pigment Violet 19 gamma are unsubstituted quinacridones. The beta crystal is a violet and the gamma crystal is a red. Color Index Pigment Red 202 is 2,9-dichloroquinacridone.

Those skilled in the art having the benefit of the teachings of the present invention as hereinabove set forth, can effect numerous modifications thereto. These modifications are to be construed as being encompassed within the scope of the present invention as set forth in the appended claims.

Example 11

Solvent Extractable Test

Preparation of low density polyethylene test plaques. Food grade low density polyethylene (WYE) from Equistar Chemicals LP, Houston Tex., was colored with 0.5% pigment and then pressed into rectangular plaques measuring 2.25"× 1.75" and 0.125" thick. The total surface area of the LDPE is 23.6 square inches. Non colored LDPE plaques were also prepared for use as blanks and for spike/recovery studies.

Stainless steel rods were used for holding the LDPE plaques at least 5 mm apart in the migration vessel. The sample holder was then place in 16 oz. wide mouth glass bottle and 250 ml of hot solvent (10% ethanol in water) was added. The bottle was sealed with a Teflon lined cap. A line was drawn on the bottle to mark the level of the solvent in the bottle to check for possible loss of gaseous solvent from the extraction vessel. The bottles were then placed in an oven at the appropriate temperature as required for the specific condition of use.

Four sets of test samples were prepared and the solutions were analyzed after 2, 24, 96 and 240 hours. The test was conducted to meet the conditions of use B as listed in Appendix II of the USFDA Guidance for Industry, preparation of FCNs and FAPs for food contact substances: Chemistry Recommendations, Final Guidance, April 2002. The initial 2 hours was done at 100° C. The tests after 24, 96 and 240 hours were conducted at 40° C. The 2, 24 and 96 hour samples were carried out once. The 240 hours (10 day samples) were done in triplicate. Blanks were also prepared after each migration test condition.

Validation experiments were performed using LDPE blank solution from the 10 day extraction. Each of the solutions were fortified at approximately one-half, one, and two times respectively, the average amount of migration.

At the end of each extraction time the samples were allowed to cool to room temperature and the LDPE plaques removed from the migration vessel. The solutions were then evaporated to dryness in a 250-ml beaker. The residue was dissolved in 10 mL of Dimethyl Sulfoxide (DMSO). Visible spectra of the solutions were obtained from 350 to 700 nm. The absorbance at the wavelength of maximum absorption (530 nm) was measured. The absorbance of the blank at the same wavelength was subtracted from the sample absorbance. The final results were corrected for recovery as determined from the blank solutions fortified with PV55. A calibration curve of the test pigment in DMSO at three levels corresponding to 5, 10 and 20 ppb (equivalent to 1.20 2.40, and 4.80 μg/10 mL) was obtained and the response was found to be linear.

Four samples of Type III crystal that were conditioned for use in plastic were tested according to the above procedure in triplicate and the results were averaged. Sample A 7.8 ppb, Sample B <5 ppb, Sample C <5 ppb, and Sample D 6.3 ppb.

What is claimed is:

1. A pigment comprising 2,9-dimethoxyquinacridone and 2,9-dichloroquinacridone, made by the process comprising the steps of:
    a) heating a mixture of 2,5-di(4-methoxyanilino)terephthalic acid, and 2,5-di(4-chloroanilino)terephthalic acid in polyphosphoric acid at a temperature less than 105° C. to form a mixture of 2,9-dimethoxyquinacridone and 2,9-dichloroquinacridone;
    b) combining the mixture of 2,9-dimethoxyquinacridone and 2,9-dichloroquinacridone with water; and
    c) heating the mixture of 2,9-dimethoxyquinacridone and 2,9-dichloroquinacridone,
    wherein the pigment comprises crystal form Type II, crystal form Type III, or a mixture thereof.

2. The pigment of claim 1, where after step c, a presscake is formed by filtering the mixture of 2,9-dimethoxyquinacridone, 2,9-dichloroquinacridone, and water; the presscake is mixed with water, the pH of the mixture is adjusted to not less than about 12, and the presscake and water mixture is heated.

3. The pigment of claim 2, where the presscake and water mixture is heated to a temperature greater than about 100° C.

4. The pigment of claim 1, where the pigment in an automotive solvent basecoat/clearcoat paint system has CIE color coordinates of about $8.0 \leq a^* \leq$ about 33.0, about $-32.1 \leq b^* \leq$ about −12.1, and about $19.0 \leq C^* \leq$ about 41.0.

5. The pigment of claim 1, where the pigment in an automotive solvent basecoat/clearcoat paint system has CIE color coordinates of about $10.0 \leq a^* \leq$ about 31.0, about $-25.0 \leq b^* \leq$ about −17.0, and about $22.0 \leq C^* \leq$ about 39.0.

6. The pigment of claim 1, where the pigment comprises from about 10% to about 90% of 2,9-dimethoxyquinacridone and from about 90% to about 10% of 2,9-dichloroquinacridone.

7. The pigment of claim 1, where the pigment comprises from about 25% to about 75% of 2,9-dimethoxyquinacridone and from about 75% to about 25% of 2,9-dichloroquinacridone.

8. The pigment of claim 1, where the pigment has X-ray powder diffraction d-values at about 3.4 Å, about 4.2 Å, about 6.4 Å, about 8.3 Å, and about 16.7 Å.

9. The pigment of claim 1, where the pigment is less than 10 ppb solvent extractable.

10. A pigment comprising 2,9-dimethoxyquinacridone and 2,9-dichloroquinacridone, that comprises crystal form Type II.

11. A pigment comprising 2,9-dimethoxyquinacridone and 2,9-dichloroquinacridone, that comprises crystal form Type I and II.

12. A process comprising the steps of:
   a) heating a mixture of 2,5-di(4-methoxyanilino)terephthalic acid, and 2,5-di(4-chloroanilino)terephthalic acid in polyphosphoric acid at a temperature less than 105° C. to form a mixture of 2,9-dimethoxyquinacridone and 2,9-dichloroquinacridone;
   b) combining the mixture of 2,9-dimethoxyquinacridone and 2,9-dichloroquinacridone with water; and
   c) heating the mixture of 2,9-dimethoxyquinacridone and 2,9-dichloroquinacridone at a temperature not more than 110° C.

13. The process of claim 12 further comprising a step after step c of: forming a presscake by filtering the mixture of 2,9-dimethoxyquinacridone, 2,9-dichloroquinacridone, and water; the presscake is mixed with water, the pH of the mixture is adjusted to not less than about 12, and the presscake and water mixture is heated.

\* \* \* \* \*